April 1, 1930.                P. SCRIMGER                1,753,136
                    MOUNTING DEVICE FOR SEED PLANTERS
                          Filed Jan. 20, 1926
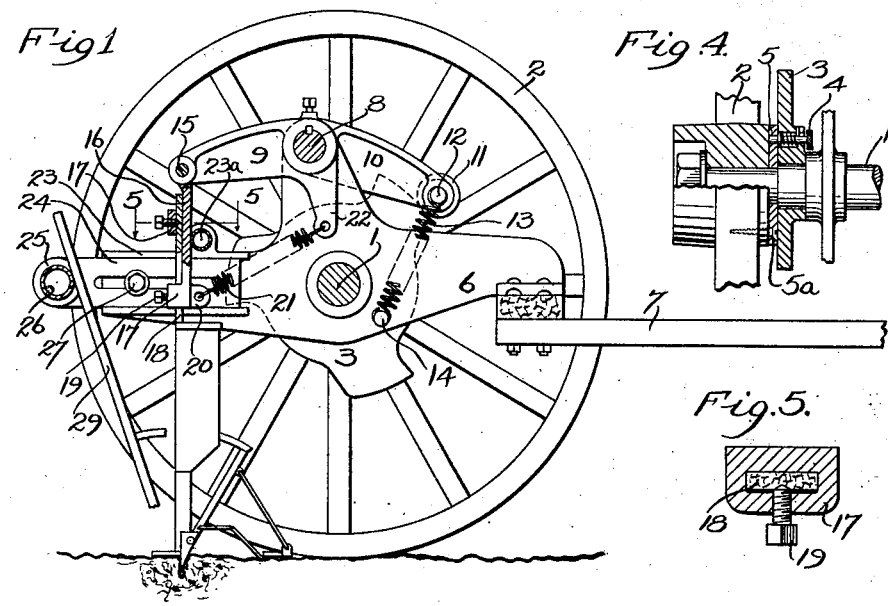
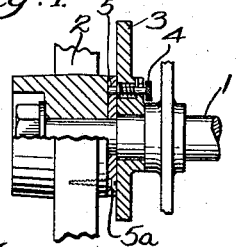
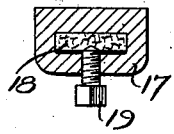
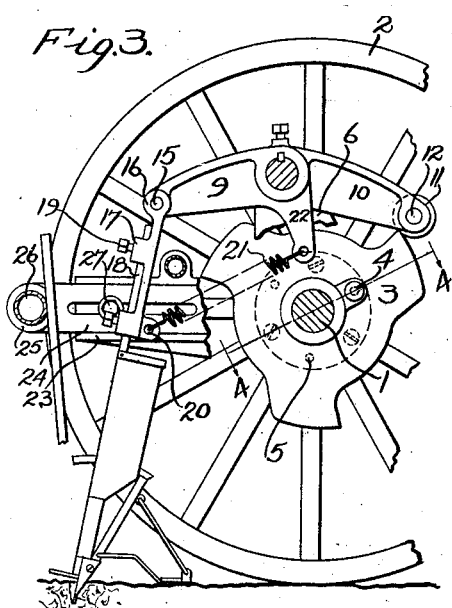
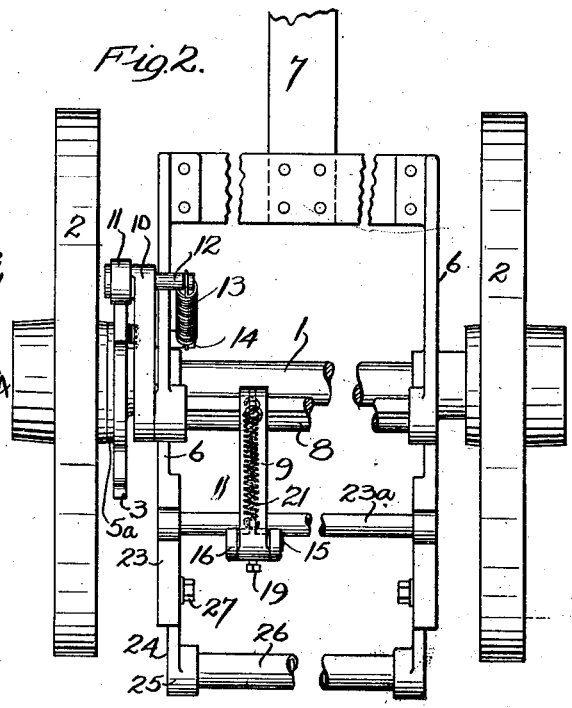
INVENTOR
Peter Scrimger
BY
ATTORNEY Patented Apr. 1, 1930

1,753,136

UNITED STATES PATENT OFFICE

PETER SCRIMGER, OF DETROIT, MICHIGAN

MOUNTING DEVICE FOR SEED PLANTERS

Application filed January 20, 1926. Serial No. 82,433.

This invention relates to improvements in mounting devices for seed planters.

It is an object of the invention to provide a mounting device which will support various known makes of seed planters, and, if necessary, operate the seed dropping mechanism of the planter at predetermined intervals, and raise and lower the planter from and onto the ground. The mounting device may be installed on any vehicle, and any desired number of planters may be mounted thereon so that several rows of seed may be planted simultaneously.

Another object of the invention is to so construct the mounting device that its operating mechanism may be rendered inoperative when desired, as, for instance, when driving from the barn to the field.

Having thus briefly outlined the major purposes of the invention I will now proceed to describe an embodiment thereof with the aid of the accompanying drivings.

Figure 1 illustrates a side elevation of the device mounted on a vehicle and with a seed planter supported thereby.

Figure 2 is a plan of the mounting device on a vehicle.

Figure 3 is a partial side elevation of the device with the planter just prior to its being raised off the ground.

Figure 4 is a section on the line 4—4 of Figure 3, and

Figure 5 is a section on the line 5—5 of Figure 1.

Referring now to the drawings, 1 designates an axle and 2 a pair of wheels of a vehicle. On the axle is a cam 3 so mounted that it may be turned by the rotation of the axle or allowed to remain stationary. In the drawings the means shown for accomplishing this consist of a pin 4 the end of which may be introduced into one of the holes 5 in the plate $5^a$ secured to the boss of one of the wheels. But any other preferred means may be employed for achieving this object. On the axle I provide two members 6 which are maintained in substantially the position shown in Figures 1 and 2 by the member 7 supported by the other pair of wheels of the vehicle (not shown). Mounted in these members 6 is a shaft 8 having arms 9 and 10 keyed thereon. Towards the outer end of the arm 10 a roller 11 is revolvably mounted so that it bears against the periphery of the cam 3. The roller is held constantly against the cam by a spring 13 one end of which is attached to the roller spindle 12 and the opposite end to a pin 14 projecting from one side of the member 6.

Towards the outer end of the arm 9 is a pin 15 on which the supporting arm 16 is pivotally hung. This supporting arm is supplied with holding members 17 to receive the handle 18 of a seed planter which is held therein as by set screws 19. Towards the lower end of the supporting arm is an eye 20 to receive one end of the coil spring 21, the opposite end of which is in engagement with a depending portion 22 of the arm 9. The rear portions of the members 6 may be braced transversely by a member $23^a$ which also limits the swing of the handle 18 of the seed planter in one direction, and these rear portions are also provided with guides 23 to receive the slides 24 integral with which are bosses 25 between which the crossbar 26 is arranged. These guides and slides have slotted holes therein to permit of the insertion of bolts 27; the nuts 28 on the latter are tightened up when the slides have been so set that the cross bar 26 will bear against the operating lever 29 of the seed planter when the latter is in a substantially vertical position.

The lever 29 above referred to forms part of seed planters of known make. Its function is to open the seed releasing mechanism when pushed inwards towards the handle 18. In these machines the outward movement of the lever is taken care of by spring mechanism in the planter.

The operation of the device is as follows:

As the vehicle moves the cam 3 turns with the axle 1. The spring 13 holds the roller 11 in constant contact with the cam so that pivotal movement is imparted to the shaft 8, which in turn raises and lowers the outer end of the arm 9. In this manner the seed planter is alternately raised from and lowered onto the ground. As the supporting arm 16 is merely pivotally attached to the arm 9 it follows that when the arm has been lowered onto the ground the contact of the latter with the bottom of the seed planter will cause the latter to gradually assume an inclined position as shown in Figure 3 as the vehicle continues to travel. As the operating lever cannot move backwards with the rest of the planter on account of the crossbar 26, the lever is forced inwards towards the handle 18 sufficiently to operate the seed releasing mechanism. Then when the roller leaves each high spot on the cam the arm 9 is forced upwards lifting the planter off the ground and then the spring 21 pulls the planter back into its vertical position.

The arrangement of the guides 23 and slides 24 permits of the crossbar 26 being so set that a very slight movement of the latter will cause the operating lever 29 to function.

If the device is to be used to support another known type of seed planter wherein the seed chute is opened by contact with the ground it is obviously unnecessary to provide the guides 23, slides 24 or crossbar 26. Moreover though only one seed planter is shown in the accompanying drawings, by duplicating the arms 9 and supporting arms 16 as many seed planters may be mounted in a gang as desired.

While in the foregoing I have described and shown the preferred embodiment of the invention it is understood that the construction is susceptible to such modifications as fall within the scope of the appended claims.

What I claim as my invention and desire to secure by Letters Patent is:

1. In a device of the character described, the combination with a planter having an upwardly extending pivotally mounted operating lever adapted to be reciprocated to discharge seeds therefrom, of a vehicle having an axle and wheels, a cam rotatable with said wheels, a rock shaft, means for supporting said rock shaft from the axle of said vehicle, means for oscillating said rock shaft as said cam rotates, an arm fixed on said rock shaft, a support pivotally arranged on the extremity of said arm, said planter held pivotally by said support to swing back on engaging the ground and adapted to be moved up and down by the movement of said rock shaft, a fixed crossbar against which the operating rod rests and which forces said rod forward as the planter swings back to discharge seeds therefrom, and spring means for tending to hold said planter in a vertical position.

2. In a device of the character described, the combination with a planter having an upwardly extending pivotally mounted operating lever adapted to be reciprocated to discharge seeds therefrom, of a vehicle having an axle and wheels, a cam rotatable with said wheels, a rock shaft, means for supporting said rock shaft from the axle of said vehicle, means for oscillating said rock shaft as said cam rotates, an arm fixed on said rock shaft, a support pivotally arranged on the extremity of said arm, said planter being held by said support to swing back on engaging the ground and adapted to be moved up and down by the movement of said rock shaft, guides supported from the axle of said vehicle, slides having horizontal adjustment in said guides, a crossbar extending between said slides against which the operating rod rests and which forces said rod forward as the planter swings back to discharge seeds therefrom, and spring means for tending to hold said planter in a vertical position.

3. A wheeled device for use in planting and having a depending receptacle for receiving the seeds and discharging same provided with a discharge nozzle and a reciprocable operating handle for releasing the seeds upon movement of the handle in one direction, a swingable support for the seed receptacle to permit movement of the same when the nozzle engages the ground, means for raising and lowering the support to engage the nozzle with the ground, a fixed bar, and the handle of the planter adapted to be reciprocated by the bar upon movement of the planting member upon engagement of the nozzle with the ground to release the seeds.

PETER SCRIMGER.